April 1, 1930.                C. R. WASEIGE                1,752,624
                  STEERING MECHANISM FOR MOTOR VEHICLES
                     Filed June 18, 1927        2 Sheets-Sheet 1
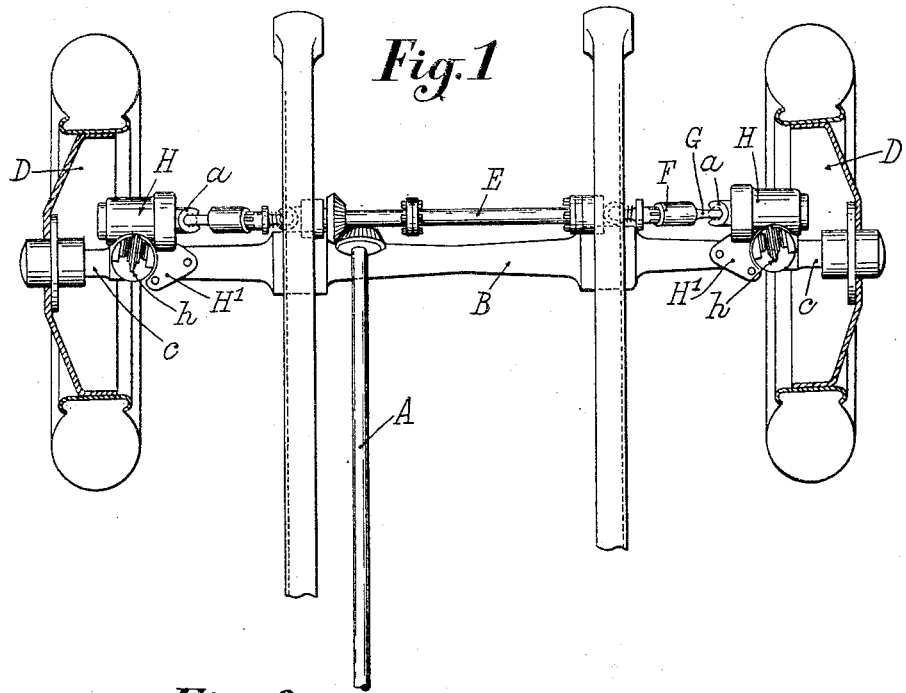
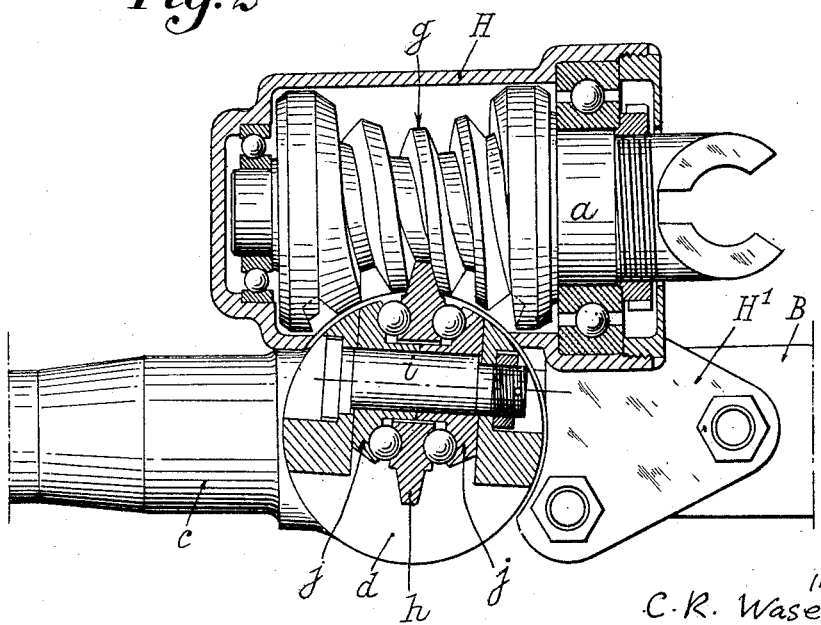

April 1, 1930.  C. R. WASEIGE  1,752,624

STEERING MECHANISM FOR MOTOR VEHICLES

Filed June 18, 1927    2 Sheets-Sheet 2

C. R. Waseige INVENTOR

By: Marks & Clerk
ATTYS.

Patented Apr. 1, 1930

1,752,624

UNITED STATES PATENT OFFICE

CHARLES RAYMOND WASEIGE, OF RUEIL, FRANCE, ASSIGNOR TO HENRI ET MAURICE FARMAN, OF BILLANCOURT, FRANCE

STEERING MECHANISM FOR MOTOR VEHICLES

Application filed June 18, 1927, Serial No. 199,810, and in France July 1, 1926.

The present invention relates to improvements in steering mechanisms for motor vehicles, of the type in which the two wheels are actuated independently of one another by means of respective gearings adapted to be operated from the steering post through the medium of a suitable transmission gear.

The invention has for its object to provide a steering mechanism of this type wherein the rotation of the said shaft is transmitted to the steering pivot of each wheel through the medium of a gearing which is specially determined in such manner that the ratio will vary according as the vehicle is steered to the right or left, so that the inner and the outer front wheels of the vehicle, when turning to one side, will always rotate about a centre which is situated substantially on the centre line of the rear axle. The invention has also for its object a steering mechanism of this type wherein the gearing is so designed that the ratio thereof will be variable according to the amplitude of steering.

In the accompanying drawings, given by way of example:

Fig. 1 is a plan view of my improved steering mechanism;

Fig. 2 is a plan view, on a larger scale, partly in section along the line 2—2, Fig. 3;

Figure 3:
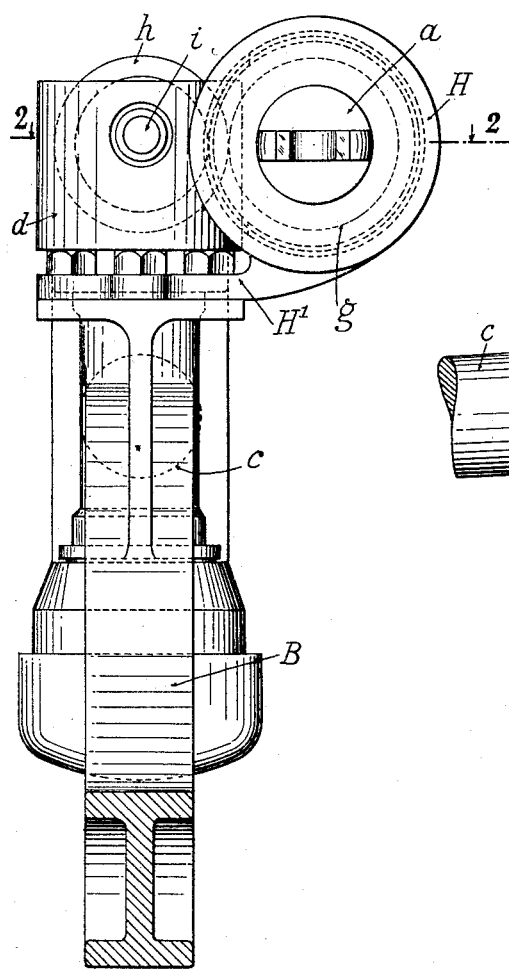
Fig. 3 is an elevational side view partly in section along the line 3—3, Fig. 4.
Figure 4:
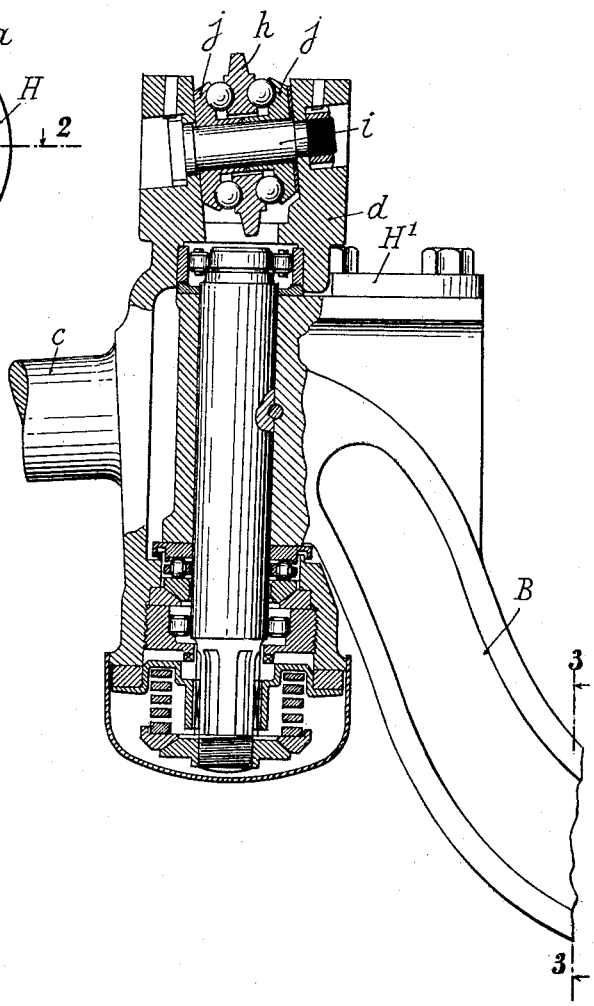
Fig. 4 is a front elevation view partly in section.

As shown in Fig. 1, the steering post A actuates by means of bevel gears a cross shaft E conveniently journalled on the vehicle frame. Upon each end of the shaft E, is splined a coupling sleeve F in engagement with a short shaft G connected by a knuckle joint with a shaft $a$ journalled in a casing H rigidly secured to the front axle B by means of a bracket H' (Fig. 3).

A worm $g$ (Fig. 2) having a concave outline is keyed upon each of the shafts $a$ and engages with a corresponding tooth formed by a ring $h$ rotatably mounted on a stud shaft $i$ which is secured to the steering pivot $d$ of the corresponding steering wheel D, said steering pivot being integral with the wheel journal $c$.

When the steering post A is rotated, the worms $g$ act upon the respective rings $h$ and cause them to swing laterally carrying with them the stud shafts $i$ whereby a steering motion is imparted to the wheel pivots and the wheels.

Each of the rings $h$ is mounted on its corresponding stud shaft $i$ by means of ball thrust bearings $j$ adapted to absorb the reactions of the road; in this manner the said ring will also rotate around its own axis under the action of the screw $g$.

To obtain the aforesaid steering action, the pitch of the screws $g$ is variable, so that a given right or left handed rotation of the shaft $a$ will provide a different amount of rotation of the steering pivot to the right or left and the inner and outer front wheels of the vehicle, when turning to one side, will rotate about a centre which is situated substantially on the centre line of the rear axle.

Obviously, the said invention is not limited to the constructions herein described which are given solely by way of example, and may be suitably modified in detail without departing from the scope of the invention.

Having now described my invention, what I claim as new and desire to secure by Letters Patent is:

1. In a steering mechanism for motor vehicles the combination with each steering pivot of a worm of variable pitch mounted on the steering axle and adapted to be operated by the steering shaft and a member mounted on the corresponding steering pivot and engaging said worm, the variation in the pitch of said worm being so predetermined that both steering wheels are adapted to rotate about a centre which is substantially situated on the centre line of the non-steering axle when the vehicle is steered to the right or left.

2. In a steering mechanism as claimed in claim 1, the further feature residing in that said worm engaging member consists of a disc rotatably mounted on the corresponding steering pivot about an axis at right angles with the pivot axis.

3. In a steering mechanism as claimed in claim 1, the further feature residing in that said worm engaging member consists of a disc rotatably mounted on the corresponding steering pivot about an axis at right angle with the pivot axis and thrust bearings supported by said steering pivot on either side of said disc.

4. In a steering mechanism for motor vehicles, the combination of two worms of variable pitch, means for operatively connecting both of said worms to the steering post and means for operatively connecting each of said worms to the respective steering pivot.

In testimony whereof I have signed my name to this specification.

CHARLES RAYMOND WASEIGE.